United States Patent Office 2,728,634
Patented Dec. 27, 1955

2,728,634

PROCESS OF TREATING PHOSPHATE ROCK FOR RECOVERY OF FLUORINE CHEMICALS AND PRODUCTION OF FERTILIZERS

Ralph Miller, Pleasantville, N. Y., assignor to The Chemical Foundation, Incorporated, a New York membership corporation No Drawing. Application July 13, 1953,
Serial No. 367,750

1 Claim. (Cl. 23—88)

This invention is concerned with the processing of phosphate rock, the recovery of fluorine chemicals therefrom and the production of mixed fertilizers.

"The commercial grades of domestic phosphate rock that contain more than 66 percent B. P. L. (bone phosphate of lime) (30.2 percent $P_2O_5$) carry more than 3 percent but usually less than 4 percent of fluorine and a portion of the fluorine is evolved in the manufacture of superphosphate. At a number of domestic plants that produce ordinary superphosphate as well as some that manufacture double superphosphate (also called triple or treble superphosphate) the volatilized fluorine is recovered as hydrofluosilicic acid and is marketed chiefly as barium, zinc, ammonium, magnesium and sodium fluosilicates, principally the latter. At most of the plants, however, the volatilized fluorine either is allowed to escape to the atmosphere or is absorbed in water and the solution run to waste."

The above quotation is from a paper by K. D. Jacob, H. L. Marshall, D. S. Reynolds and T. H. Tremearne of the U. S. Department of Agriculture published in "Industrial and Engineering Chemistry," volume 34, page 722 (1942). It succinctly points out the present status of the recovery of fluorine as hydrofluosilicic acid from the gases evolved in superphosphate manufacture.

Most superphosphate manufacturers waste the evolved fluorides because they cannot be recovered at a profit. The primary reason that the evolved fluorides cannot be recovered at a profit is the relatively low commercial value of silicofluorides, the small quantity of fluorine evolved, and the expense incurred in recovering the evolved fluorine as hydrofluosilicic acid. Since relatively small quantities of fluorine are evolved even from superphosphate plants of moderate size, the recovery of this fluorine cannot be made worthwhile unless additional values can be secured over and above the value of the recovered fluorine-containing products. An additional necessity is the simplification of the fluorine recovery process so that the fluorine recovery equipment can be built at moderate cost.

An additional object of this invention is to integrate the recovery of the fluorine contained in the gases evolved when phosphate rock is acidulated with the production of additional values.

Other objectives of this invention will be pointed out below.

The difficulty in recovering fluorine economically from the gases evolved in the acidulation of phosphate rock can be more readily comprehended when it is realized that a superphosphate plant acidulating 300,000 pounds of rock daily will usually evolve about 3,000 pounds of fluorine, principally as gaseous silicon tetrafluoride. The absorption of this gas in water to form hydrofluosilicic acid requires a multitower absorption system. Since hydrofluosilicic acid is a strong acid, the absorption system must be made of corrosion resistant materials. The production of hydrofluosilicic acid by absorption of silicon tetrafluoride in water may be represented as:

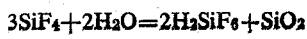

A part of the silica is insoluble in the resulting hydrofluosilicic acid and forms a gelatinous solid that clings to various parts of the absorption system. In fact, it is not feasible to use baffles in the absorption towers because the baffles cannot be kept free from precipitated silica. As a result the only contact between the gas and the absorbent is due to the sprays formed by pumping the solution through spray nozzles located within the tower. This method of contacting a gas with a solution is quite inefficient. In addition, some silica tends to deposit on the spray nozzles and interferes with their proper functioning. To secure continuity of operation the silica suspended in the hydrofluosilicic acid must be removed either in a settler or a filter. To resist the corrosive nature of the hydrofluosilicic acid the pumps, pipe lines, nozzles, etc., must be made of a corrosion resistant metal such as Monel metal.

It is now known that hydrofluosilicic acid dissolves silica and forms solutions containing more than one mol of silica for every six equivalents of fluoride. Hence, the solutions formed by absorbing silicon tetrafluoride in water are not hydrofluosilicic acid but hydrofluosilicic acid containing dissolved silica. This silica comes out of solution when silicofluorides or fluorides are formed from the hydrofluosilicic acid. When insoluble silicofluorides are made from such a solution the excess silica precipitates along with the silicofluoride, thereby decreasing its purity.

In view of the difficulty of efficiently absorbing silicon tetrafluoride, it is necessary to scrub the evolved gases with very large quantities of water to prevent the escape of noxious quantities of fluorine into the atmosphere. In one typical instance a plant treating 300,000 pounds of phosphate rock a day has to scrub the evolved gases with 500 gallons of water a minute.

The washing of the evolved gases with water to prevent undesirable amounts of fluorine from escaping into the atmosphere is not the only expense to which the superphosphate producer is put as a result of the fluorine contained in the phosphate rock. When acidulating phosphate rock with sulfuric acid, the fluorine is evolved as a result of a series of reactions which may be represented as:

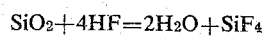

Hence not only is the fluorine a source of annoyance and a waste disposal problem but it also consumes sulfuric acid with no resulting benefit. The evolution of 3,000 pounds of fluorine as silicon tetrafluoride from phosphate rock consumes about 11,000 pounds of 70% sulfuric acid.

As related above two of the objectives of this invention are the simplification of the recovery of the fluorine and the use of equipment of moderate cost in this recovery. To achieve the former the prevention of silica precipitation is necessary, and to achieve the latter relatively non-corrosive solutions must be formed in the absorption operation. This is accomplished by replacing water as an absorption medium with an aqueous solution containing ammonium fluoride. Each mol of silicon tetrafluoride is absorbed in a solution containing 2 mols of ammonium fluoride. In this way a relatively non-corrosive solution of ammonium fluosilicate is formed. No silica precipitates. Hence, if spray nozzles are used in the absorption system no silica deposits on them to interfere with their operation. Moreover, baffles or other gas liquid-contacting devices can be employed to increase the physical contacting of the gas and absorption liquid. The pH can be controlled about the neutral point so that the vapor pressure of the fluorine from the solution remains negligible. Instead of the solution containing an excess of silica as is the case when hydrofluosilicic acid is formed, the fluoride concentration is controlled so that, if anything, more than six equivalents of fluoride are present for each mol of silica in solution.

The concentration of ammonium fluosilicate can be maintained within a wide range depending upon the temperature at which the circulating solution is controlled.

The ammonium fluosilicate solution while produced more simply than by prior processes is usually not sufficiently valuable to warrant its production. To integrate the recovery of fluorine with the production of additional values the inherent acidity of the silicon tetrafluoride is utilized.

Most of the superphosphate that is made is applied to the soil as one component of a mixed fertilizer. The other two principal components in a mixed fertilizer are nitrogen and potassium. The cheapest form of nitrogen is ammonia. One of the most economical ways of fixing ammonia is by the ammoniation of superphosphate. It so happens that the amount of ammonia that can be fixed in this way is limited and it is necessary to add additional nitrogen to mixed fertilizers in a solid form such as ammonium nitrate or ammonium sulfate. At the present writing ammonia in the form of ammonium sulfate is worth about twice as much as ammonia as anhydrous liquid ammonia. Liquid ammonia is worth about 4 cents a pound. A pound of ammonia in the form of ammonium sulfate is worth about 8 cents a pound.

The inherent acidity of the silicon tetrafluoride may be utilized in a number of ways. One useful method is made up of the following operations. A portion of the circulating ammonium fluosilicate solution is withdrawn from the circuit. To this portion in a separate reaction vessel sufficient ammonia is added to convert the ammonium fluosilicate to silica and ammonium fluoride.

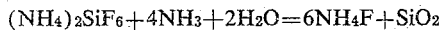

The precipitated silica is separated from the resulting solution. The separated solution is divided into two portions. One portion is returned to the absorption system. The other portion is treated with an amount of sodium sulfate equivalent to its ammonium fluoride content. The resulting reaction is:

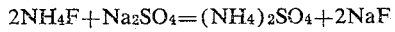

Since sodium fluoride is only slightly soluble in the ammonium sulfate solution it precipitates out as a solid. The solid sodium fluoride is separated from the ammonium sulfate solution. The ammonium sulfate solution is added to the sulfuric acid used to acidulate additional phosphate rock. The superphosphate so made contains some fixed nitrogen without the consumption of any additional sulfuric acid.

From the foregoing it is seen that it is preferred to recirculate the 2 mols of ammonium fluoride for each mol of silicon tetrafluoride absorbed. The ammonium fluoride is recycled in solution. It is a simple matter to maintain the concentration of the circulating fluosilicate solution in the neighborhood of 25% ammonium fluosilicate. The precipitation of the silica is carried out as a distinct step. By carrying out the precipitation while the solution is quite warm the silica that precipitates is not gelatinous but hard and readily filterable. The solution of ammonium fluoride which results from the silica precipitation step can be controlled to contain from 20 to 30% ammonium fluoride and the ammonium sulfate solution can be produced in about a 40% concentration. The silica may be considered a waste product which is easily disposed of.

It is to be noted that by converting the silicon tetrafluoride to a simple fluoride, rather than a fluosilicate, three times as much ammonia can be fixed.

The process described can be carried out in simple equipment. An important advantage of the process is that it is economical of heat. The solid separated sodium fluoride is preferably washed free from any adhering ammonium sulfate solution. The wet solids are then dried in any convenient manner. This is the only step in the process requiring heat.

Ordinary superphosphate is generally made from 70% sulfuric acid. This means the acid made in the contact sulfuric acid plant must be diluted prior to the acidulation step. By using the ammonium sulfate solution as part of the dilution liquor, the ammonium sulfate is incorporated with the superphosphate without the need of evaporating the water in which the ammonium sulfate is dissolved.

It is quite evident from the foregoing that the absorption of silicon tetrafluoride in an ammonium fluoride solution rather than water or a solution in which ammonia is dissolved materially simplifies the absorption of silicon tetrafluoride. If market conditions make it profitable to produce fluosilicates rather than fluorides, then only a third of the ammonium fluosilicate bled from the circulating solution is converted to silica and ammonium fluoride. The ammonium fluoride is recycled to the absorption step. The other two thirds of the ammonium fluosilicate is reacted with the appropriate salt to form the desired fluosilicate. In general, the sulfates are used but in certain cases the chlorides or nitrates may be employed. For example, if barium fluosilicate is to be made then barium nitrate or chloride is reacted with the ammonium fluosilicate solution since barium sulfate is very insoluble. The resulting ammonium salt solution is subsequently incorporated into a mixed fertilizer.

There is another advantage of absorbing silicon tetrafluoride in a solution of ammonium fluoride. It permits all of the fluorine to be recovered as anhydrous hydrogen fluoride. The sequence of steps which are followed are:

As concentrated a solution of ammonium fluosilicate is prepared as possible. The solution is treated with ammonia to form silica and an ammonium fluoride solution. The silica is discarded and part of the ammonium fluoride solution is recycled to the absorption step of the process. The remainder of the solution is contacted with an excess of solid sodium fluoride. The resulting mixture is evaporated. The ammonium fluoride dissociates in such a fashion that the ammonia is vaporized and solid sodium acid fluoride is formed. The ammonia is recovered and recycled to the silica precipitation step. The solid sodium acid fluoride is heated to drive off hydrogen fluoride and reform sodium fluoride. The gaseous hydrogen fluoride is recovered or used to make fluoride derivatives. The sodium fluoride is returned to the ammonia vaporization step. In this way it is possible to produce hydrogen fluoride or fluorides free from silica from the silicon tetrafluoride formed when phosphate rock is acidulated.

I claim:

The process comprising the steps of mixing sulfuric acid with a solution of ammonium sulfate, acidulating phosphate rock with said mixture to form ammonia containing superphosphate and to evolve gaseous silicon tetrafluoride, absorbing the gaseous silicon tetrafluoride in an aqueous solution containing about two mols of ammonium fluoride for each mol of silicon tetrafluoride absorbed to form a solution of ammonium fluosilicate, adding ammonia to the ammonium fluosilicate solution to precipitate hydrated silica and form a solution of ammonium fluoride, separating the precipitated silica from the ammonium fluoride solution recycling one third of the ammonium fluoride solution to the silicon tetrafluoride absorption step, treating the remainder of the ammonium fluoride solution with sodium sulfate to form solid sodium fluoride and a solution of ammonium sulfate, separating the solid sodium fluoride from the ammonium sulfate solution and mixing the separated ammonium sulfate solution with an additional amount of sulfuric acid and continuing the described sequence of steps.

(References on following page)

References Cited in the file of this patent

UNITED STATES PATENTS

| | | |
|---|---|---|
| 1,859,998 | Svendsen | May 24, 1932 |
| 2,156,273 | Bozarth | May 2, 1939 |
| 2,426,557 | Long et al. | Aug. 26, 1947 |
| 2,447,359 | Oakley, Jr. | Aug. 17, 1948 |
| 2,602,726 | Winter | July 8, 1952 |
| 2,636,806 | Winter | Apr. 28, 1953 |

OTHER REFERENCES

J. W. Mellor's "A Comprehensive Treatise on Inorganic and Theoretical Chemistry," vol. 6, 1925 Ed., page 946. Longmans, Green & Co., N. Y., publishers.